United States Patent Office 3,132,120
Patented May 5, 1964

3,132,120
METHOD FOR THE PREPARATION OF ETHYLENE COPOLYMERS
Peter Joseph Graham, Gladwyne, Pa., and Vernon Clare Wolff, Wilmington, Del., assignors to E. I. du Pont de Nemours and Company, Wilmington, Del., a corporation of Delaware
No Drawing. Filed Feb. 3, 1961, Ser. No. 86,853
5 Claims. (Cl. 260—78.5)

The present invention relates to the preparation of ethylene copolymers, and, more particularly, to the preparation of ethylene carboxylic acid copolymers.

Ethylene copolymers with unsaturated carboxylic acids are known in the art. They are prepared by the copolymerization of ethylene and the carboxylic acid employing a free radical initiator either in the presence or absence of an inert solvent. The utility of the copolymer depends on the molecular weight of the product and the monomer composition of the copolymer. High molecular weight copolymers, i.e., having a molecular weight in the range of plastics such as polyethylene itself, and containing a minor amount of the acid, are particularly desirable as coating resins, in that they combine the toughness, strength and impermeability characteristics of polyethylene with superior adhesion and printability not normally obtained with polyethylene. However, in order to prepare these copolymers, it is necessary to employ polymerization methods developed for the high pressure synthesis of polyethylene, i.e., temperatures above 150° C. to about 250° C. and pressures in the range of 50 to 3000 atmospheres. Under such conditions, however, the acids employed are sufficiently corrosive to cause substantial damage to the high pressure equipment if employed continuously. Furthermore, the use of unsaturated acids as comonomers is limited by their solubility in the liquid organic media employed in many of the high pressure polymerizations, such as benzene or ethylene itself.

It is, therefore, one of the objects of the present invention to provide a process for the preparation of ethylene unsaturated acid copolymers of high molecular weight and low acid content. It is another object of the present invention to provide a process for the preparation of such copolymers which eliminates the corrosion involved in the use of the acid as a comonomer. A further object is to provide a process which allows the use of a greater variety of unsaturated acids as comonomers and is not dependent on the solubility of the acid in the organic medium employed in the polymerization. Still another object is the preparation of copolymers of ethylene with unsaturated acids which give rise to outstanding coating resins. Other objects will become apparent hereinafter.

The objects of the present invention are accomplished by a process which comprises copolymerizing ethylene and the tertiary butyl ester of an ethylenically unsaturated carboxylic acid at a temperature of 100° C. to 250° C. and a pressure of 50 to 3000 atmospheres with a free radical initiator and thereafter heating the resulting copolymer at a temperature of 250° C., and preferably at a temperature of 275° C. to 350° C. until all of the ester groups have decomposed, and recovering a copolymer of ethylene and the carboxylic acid, the carboxylic acid not being decarboxylated by the pyrolysis step.

The comonomer employed with ethylene in the process of the present invention comprises the ester of the type of ethylenically unsaturated acid which has heretofore been employed in the copolymerization of ethylene. In particular, the acid component of the comonomer comprises a monocarboxylic or dicarboxylic acid having from 3 to 8 carbon atoms such as acrylic acid, methacrylic acid, ethacrylic acid, fumaric acid, maleic acid, itaconic acid, crotonic acid, etc. It is essential, from the standpoint of the present invention, that the comonomer employed be the tertiary butyl ester of the aforementioned unsaturated acids, since this is the only ester which is capable of decomposition to the acid without causing degradation of the ethylene polymer chain into which the ester of the unsaturated acid is incorporated. The use of other esters, such as for example, the ethyl ester or n-butyl ester of these acids, does not result in the desired copolymer, since copolymers obtained from these esters degrade and decompose before the ester radical can be pyrolyzed off. The acid content of the copolymer is generally maintained in the range of 0.1 to 20% by weight of the total composition.

In order to produce an outstanding coating or laminating resin, it is essential, as pointed out hereinabove, to obtain a polymer of high molecular weight, so that the coating made from the resin will have strength, flexibility, and impermeability. The high molecular weight is obtained by maintaining the concentration of the unsaturated acid comonomer charged to the polymerization reactor to less than 10% of the ethylene charged and also employing the high pressure polymerization techniques developed for the preparation of high molecular weight ethylene. Employing other polymerization methods has invariably resulted in copolymers of lower molecular weight and/or copolymers of high acid content, which are equally unsuitable for optimum coating or laminating resins which must combine strength and impermeability with good adhesion. Even with the high pressure ethylene polymerization techniques it is preferable to maintain a low concentration of the comonomer since at high concentrations the telogenic effect of the comonomer can prevent the formation of high molecular weight polymers. The telogenic effect of the comonomer will vary from comonomer to comonomer and depends on the structure of the comonomer. When copolymerizing the comonomers of the present invention, it is essential that the relative conversion of the two monomers to polymer in the process selected be taken into consideration when making up the feed streams. Thus, the conversion of the unsaturated acid ester comonomer is generally very high, between 75% and 100%, and is, aside from a temperature dependency, relatively independent of the polymerization conditions, whereas the conversion of ethylene to polymer varies from 5 to 50% and depends largely on the polymerization conditions.

Aside from this consideration, the polymerization, as practiced in this process, follows the teachings of the art. Thus, ethylene is generally polymerized in a continuous reactor which may be tubular in construction with a changing monomer concentration and temperature profile, or may be an autoclave reactor having a constant monomer concentration and constant temperature profile. The process may be carried out in the presence of a liquid polymerization medium such as water or benzene or the conditions of polymerization can be maintained such that the ethylene in liquid form serves as its own medium. The latter appears to be greatly preferred by the industry. In the case where an organic medium is employed, the present process provides the additional advantage of being capable of producing copolymers of those suitable acids which heretofore could not, or only with great difficulty, be copolymerized with ethylene using high pressure methods because of the insufficient solubility of the acid in the organic polymerization medium with the resulting inability to control the copolymerization.

The polymerization is initiated by the addition of a free radical initiator which may be oxygen, a peroxide or a diazo compound. These initiators are well known in the art. The concentration of the initiator is in accordance with prior art, and generally ranges from 0.001 to 10% by weight of the monomer. The polymerization temperature is generally maintained between 100° C. and 250° C. and preferably between 150° and 250° C. At these temperatures, particularly in view of the short contact times, no measurable decomposition of the ester occurs. The pressure can be varied from 50 to 3000 atmospheres, but is generally maintained in the range of 15,000 to 40,000 p.s.i. By variation of temperature, pressure and initiator concentration and half life, it is feasible to control the molecular weight of the resulting copolymer product. In general, the copolymers made by the process of the present invention have melt indices ranging from 0.1 to 100 g./10 min., as measured by ASTM-D-1238-57T.

The resulting copolymer is then heated to a temperature of 275° C. to 350° C., preferably in the absence of air, to pyrolyze the ester group and obtain the acid copolymer. One of the reasons that only the tertiary butyl ester can be employed in the process is, of course, the fact that hydrolysis of the resulting copolymers, in which other ester groups may be equivalent to the tertiary butyl ester, is not feasible on a commercial basis. Hydrolysis methods are unsatisfactory because of the insolubility of the copolymer in polar solvents as well as many other solvents. Despite the presence of some ester groups, the great proportion of the ethylene units, combined with the high molecular weight, make hydrolysis a poor technique for the recovery of the acid group. Although some decomposition occurs at temperatures below 275° C. a complete decomposition of the ester groups in the polymer which, of course, is essential to obtain the acid copolymer is not obtained at all, or obtained only after exceedingly long heating times and, therefore, not practical. At temperatures above 350° C., the decomposition of the polymer itself becomes a major and limiting factor. The hold-up time necessary to achieve complete pyrolysis of the ester radical will depend on the temperature, decreasing with increasing temperatures. At temperatures around 300° C., the hold-up time usually occurring in a melt extruder is sufficient to cause pyrolysis of the ester form of the copolymer to the acid form, so far as can be measured by the common analytical tools available. As a matter of fact, passing the ester copolymer through a melt extruder at temperatures around 300° C. constitutes the preferred method of carrying out the conversion of the ester copolymer to the acid copolymer. However, other means of heating the copolymer in the substantial absence of oxygen would be equally suitable.

The invention is further illustrated by the following examples. Unless otherwise indicated, all measurements are by weight.

EXAMPLE I

Ethylene containing 1.3% of tert.-butyl methacrylate was polymerized in 2000 ml. autoclave at 205° C. and 1350 atmospheres. The ethylene was charged at a rate of 5.63 p.p.h. and the methacrylate comonomer at a rate of 0.07 p.p.h. The initiator, t-butyl peracetate, was charged at a rate of 0.04 g.p.h. An overall 13% conversion to polymer was obtained. The resulting copolymer was found to have a melt index of 2.5 g./10 min. Substantially all of the tert.-butyl methacrylate was converted to polymer. The polymer contained 0.2% of methacrylic acid resulting mainly from impurities in the monomer. The resulting copolymer was passed through a 1½" extruder maintained at 290° C. and equipped with a nylon screw and 20/60/100 mesh screens. The extruded product was water quenched. The resulting copolymer on titration of free acid by standard procedure, showed a methacrylic acid content of 4.2% and no significant ester content by infrared analysis. The polymer had a melt index of 1.4 g./10 min. Table I shows a comparison of properties of the ethylene-methacrylic acid copolymer prepared by the foregoing procedure with a copolymer directly synthesized.

Table I

|  | Melt Index, g./10 min. | Percent Acid | Percent Ink Removed | Elmendorf Tear Strength in g./ml. |
|---|---|---|---|---|
| Ethylene/methacrylic acid copolymer as synthesized | 2.9 | 5.2 | 60 | 400 |
| Ethylene/methacrylic acid copolymer prepared by pyrolysis of t-butyl ester | 1.4 | 4.2 | 50 | 291 |

The melt index technique employed is that described in ASTM-D-1238-57T. The acid content is determined by a titration procedure. The ink removal values are obtained by applying ink to a thin film of the polymer tested and after thorough drying, applying pressure-sensitive cellophane tape to the inked surface and removing the tape. The percentage of ink removed is measured. The measurement of Elmendorf tear strength has been published and is well known. As can be seen from the data, the properties of the copolymers are very similar.

EXAMPLE II

The foregoing example was repeated with 1.0% tert.-butyl acrylate in the monomer feed stream. The resulting copolymer was extruded through the melt extruder using a temperature of 305° C. Table II below shows a comparison of properties of the so-prepared ethylene-acrylic acid copolymer and a directly synthesized ethylene-acrylic acid copolymer.

Table II

| Copolymer | Melt Index g./10 min. | Density in g./cc. (annealed) | Percent Acid | Peel Strength in lbs./in. | Elmendorf Tear Strength in g./ml. |
|---|---|---|---|---|---|
| Ethylene/acrylic acid copolymer as synthesized | 3.9 | 0.923 | 2.5 | 6.6 | 227 |
| Ethylene/acrylic acid copolymer prepared by pyrolysis | 1.6 | 0.924 | 2.9 | 5.3 | 281 |

Again, it is apparent that the copolymer prepared by the pyrolysis of the tertiary butyl ester copolymer is substantially the same as obtained by direct polymerization of ethylene and acrylic acid.

EXAMPLE III

Using the procedure of Example I, ethylene and the di-tert.-butyl ester of maleic acid are copolymerized and the resulting copolymer pyrolyzed to the ethylene maleic acid copolymer by extrusion at a temperature of 300° C. in the extruder barrel. Substantially all of the tert.-butyl ester groups are removed to give rise to an ethylene maleic acid copolymer.

The foregoing examples have illustrated the novel features of the process of the present invention but are not to be construed as limiting the invention thereto. Various modifications will be apparent.

One of the major advantages of the process of the present invention is that the process allows the production of ethylene carboxylic acid copolymers without danger of corrosion to extremely expensive process equipment, particularly polymerization reactors. The corrosion to extruders used in the present invention is minimized by the relatively inactive form of the acid, once it is incorporated into a long polymer chain.

Another major advantage is that the process allows the preparation of ethylene copolymers with ethylenically unsaturated acids which have low solubilities in organic media, since the tert.-butyl esters of such acids are substantially more and sufficiently soluble in the organic media to be employed in the copolymerization. This is particularly the case with the dicarboxylic acids suitable in the process of the present invention.

The copolymers prepared by the present invention are extremely valuable adhesives and coating resins which are particularly useful for the coating of paper products and other substrates.

We claim:

1. A process for the preparation of ethylene-carboxylic acid copolymers which comprises polymerizing ethylene at a temperature of 100° C. to 250° C. and a pressure of 50 to 3000 atmospheres using a free radical initiator, with the tert.-butyl ester of an ethylenically unsaturated carboxylic acid containing from 3 to 8 carbon atoms, said ester being employed in a concentration of 0.1 to 20% by weight, and thereafter heating the resulting ethylene tert.-butyl ester copolymer to a temperature of 275° to 350° C. in the substantial absence of oxygen.

2. The process as set forth in claim 1 wherein the heating step is carried out in a melt extruder.

3. The process as set forth in claim 1 wherein the acid is acrylic acid.

4. The process as set forth in claim 1 wherein the acid is methacrylic acid.

5. The process as set forth in claim 1 wherein the acid is maleic acid.

References Cited in the file of this patent

UNITED STATES PATENTS

| | | |
|---|---|---|
| 2,117,349 | Neher | May 17, 1938 |
| 2,953,551 | White | Sept. 20, 1960 |

OTHER REFERENCES

J. of Physics and Colloid Chem. pages 52, 357–63 (1948).